United States Patent [19]

Edwards

[11] 4,201,150
[45] May 6, 1980

[54] APPARATUS FOR COATING A WEB
[75] Inventor: Harry Edwards, Blackley, England
[73] Assignee: Imperial Chemical Industries Limited, London, England
[21] Appl. No.: 951,258
[22] Filed: Oct. 13, 1978

Related U.S. Application Data

[63] Continuation-in-part of Ser. No. 818,266, Jul. 22, 1977, abandoned.

[30] Foreign Application Priority Data

Apr. 13, 1977 [GB] United Kingdom ............... 15284/77

[51] Int. Cl.² .............................................. B05C 5/00
[52] U.S. Cl. .................................... 118/323; 118/314; 239/186
[58] Field of Search ............... 118/323, 321, 314, 325, 118/324; 239/185, 186, 187; 134/172, 180, 181; 156/78; 425/4 R, 4 C

[56] References Cited

U.S. PATENT DOCUMENTS 3,383,046  5/1968  Voegtly ............................... 239/186

FOREIGN PATENT DOCUMENTS

294996  5/1967  Australia ................................. 118/323

Primary Examiner—John P. McIntosh
Attorney, Agent, or Firm—Cushman, Darby & Cushman

[57] ABSTRACT

Apparatus comprises a liquid dispenser in which a spray head attached to a reciprocating carriage is permitted limited free movement relative to the carriage and transversely to a direction of advancement of web or sheet material, onto which the liquid is to be dispensed, when the carriage is decelerated prior to reversal of its direction of motion. Useful for backing carpets with foamable compositions at high speed.

10 Claims, 12 Drawing Figures

APPARATUS FOR COATING A WEB

This application is a Continuation-in-Part of application Ser. No. 818266 which was filed in the United States Patent Office on July 22, 1977, now abandoned.

This invention relates to apparatus for dispensing liquid reaction mixtures onto web or sheet material.

In known apparatus for dispensing liquid reaction mixtures, for example, plastic foam-forming mixtures, on semi-continuous web material, the mixture is deposited on the web material from a distributor fixedly secured to a carriage which traverses the web material in a reciprocating motion while the web material is being continuously advanced by a conveyor in a horizontal plane.

The carriage may be driven along a rail mounted transversely above the conveyor by a chain drive which is reversed by an electromagnetic clutch. Alternatively the carriage may take the form of a reciprocating ram actuated by hydraulic, pneumatic or hydropneumatic cylinders. All these devices suffer from inertia effects and very high inertial "turn-round" forces. A practical consequence of this is that while the carriage can for the most part be driven at constant speed across the conveyor, in the marginal regions the carriage requires to be decelerated, momentarily stopped to reverse its direction of motion, and accelerated up to constant speed in the reverse direction. Since the reaction mixture is normally dispensed at a constant rate the outcome is a greater deposition of liquid reaction mixture in the marginal regions. The present invention assists in smoothing out this marginal or "edge" build-up of reaction mixture.

Thus according to the present invention we provide apparatus for dispensing a liquid reaction mixture onto web or sheet material, e.g. semi-continuous web material, which comprises a carriage constructed and arranged to be driven in a reciprocating motion transversely to a direction of advancement of web or sheet material, and, attached to the carriage, a distributor connectable to a supply of the reaction mixture for depositing the reaction mixture onto the web or sheet material, the distributor being attached to the carriage by an attachment device which permits limited free movement of the distributor relative to the carriage and transversely to the direction of advancement of the web or sheet material when the carriage is decelerated prior to reversal of its direction of motion.

By "transversely to the direction of advancement" we mean having a component of motion at right angles to that direction.

Ideally the distributor should continue to travel at constant speed in the marginal regions. In theory this might be achieved by allowing the free movement of the distributor to continue under its own momentum until the carriage has regained constant speed in a reverse direction and at that point prevent further movement of the distributor relative to the carriage. Thus the direction of motion of the distributor would be reversed essentially without the distributor losing speed. In practice, however, it is difficult to achieve this particularly with high speed dispensers such as that described in Belgian Pat. No. 848,619 in which the carriage has a traversing speed of about 250 meters/minute across a 4 to 5 meter conveyor, where the problem of "edge" build-up is more noticeable. When using the dispenser described in Belgian Pat. No. 848619 the marginal regions may be 10 cm wide bands at the edges of the web material, and if that dispenser were modified in accordance with the present invention, the required distance of free movement of the distributor, from the moment of deceleration of the carriage to the moment at which the carriage regains constant speed in a reverse direction, would be of the order of 33 cm. The high impact forces created by the rapid change in velocity of the distributor impose practical design limitations, but these limitations will vary according to inter alia the speed of operation and robustness of the apparatus and the mass of the distributor. It will readily be appreciated, however, that even a small amount of free movement of the distributor will ameliorate to some degree the "edge build-up" and will permit a shorter traverse of the carriage. We have found that for the apparatus described in Belgian Pat. No. 848619 used to dispense a flexible polyurethane foam-forming mixture on the reverse side of floor covering, an acceptable distribution of foam is achieved consistent with satisfactory mechanical operation when the free movement of the distributor relative to the carriage is permitted to continue until the carriage begins to accelerate in a reverse direction.

Conveniently the distributor has two rest positions on the carriage which coincide with the limits of free movement of the distributor relative to the carriage. Accordingly the distributor may be transported by the carriage in one direction of traverse while occupying a first rest position relative to the carriage until the carriage is decelerated prior to reversal of its direction of motion, whereupon the distributor moves under its own momentum to a second rest position relative to the carriage in which it is transported in the return direction of traverse by the carriage.

In a preferred embodiment of the invention the attachment device by which the distributor is attached to the carriage is a lightweight horizontal boom which is pivoted at one end on the carriage and towards the other end carries the distributor. Free movement of the distributor is accomplished through pivotal movement of the boom, the distributor describing a horizontal arc transversely to the direction of advancement of the web or sheet material. Preferably the boom pivots between limit stops and the position of the distributor is adjustable along the length of the boom so that the length of the arc described by the distributor, i.e. the extent of free movement of the distributor relative to the carriage, can be pre-set by moving the distributor along the length of the boom.

When the distributor takes the form of a fan-spray nozzle, the nozzle will normally be positioned so that the plane of the fan-spray produced lies in the line of travel of the sheet or web material. When the nozzle is fixed to a horizontal boom this alignment of the plane of the fan-spray will be maintained while the boom remains stationary relative to the carriage but when the boom swings free at the end of the carriage traverse the plane of the fan-spray will move through an angle to the line of travel of the web or sheet material. For small angles of swing of the boom this is not significant but at high traverse speeds when a fairly wide angle of swing is necessary, the angle of the plane of the fan-spray to the line of travel of the web or sheet material may not be acceptable.

To overcome this the fan spray nozzle or other type of distributor may be carried on a plate pivotally mounted on the boom and two parallel arms placed on either side of the boom to form a parallelogram linkage with the carriage and plate. In this way the plane of the fan nozzle remains in the same direction while the boom swings freely on the carriage.

Given sufficient strength, the arms may allow the central boom to be dispensed with. Thus in another embodiment of the invention the attachment device may simply comprise two lightweight parallel arms of equal length each pivoted at one end to the carriage and at the other end to a plate carrying the distributor.

In the above described embodiments the rest positions occupied by the distributor relative to the carriage are determined by the limits of pivotal movement of the attachment device. Ideally the limit stops are viscous damping devices which absorb and dissipate the inertial energy of the distributor at the end of the free movement of the distributor to avoid the distributor "bouncing" away from its rest positions. In practice adequate damping may be difficult or costly to achieve. Thus according to a further aspect of the invention the distributor is retained in a rest position on the carriage by a detent attached to the carriage and biased towards a position for engagement with a catch member in fixed relationship to the distributor, there being a release member arranged to displace the detent to a position for disengagement of the catch member prior to deceleration of the carriage.

In the preferred embodiment the catch member is attached to the boom and the release member located at a fixed point above the line of travel of the carriage.

Normally as indicated above for preferred embodiments there will be two rest positions occupied in turn by the distributor, the change from one to the other occurring as the distributor reverses its direction of motion at each side of the conveyor. A detent and associated release member is required for each position but a common catch member may be used. The two release members will be fixed, one close to each side of the apparatus, at stations immediately before the points at which the carriage begins to decelerate prior to reversal of its direction of motion. Where the carriage is driven by a chain drive on a rail which runs transversely above the path of the web or sheet material, the release members may conveniently be adjustably fixed to the rail.

Advantageously the detent operates in co-operation with a resilient buffer, the boom striking the buffer as the catch engages the detent so that the buffer continues to exert a mild compressive force against the boom to maintain the catch and detent in firm engagement. On disengagement the compressed buffer imparts some impetus to the distributor as it resiles to assume its former shape. It is desirable, however, to keep this effect to a minimum to ensure that the distributor continues to move at substantially constant speed as the carriage decelerates.

Other devices may be used for retaining the distributor in a rest position and for releasing it for free movement prior to deceleration of the carriage.

Thus in another embodiment of this invention the distributor is retained in a rest position relative to the carriage by a pneumatically or hydraulically controlled piston attached to the carriage, there being provided a mechanism for applying gaseous or liquid pressure to the piston and a mechanism for releasing the pressure from the piston prior to deceleration of the carriage.

Conveniently the piston forms part of a 'double acting' air cylinder so that a single piston can retain the distributor in two rest positions, one in each direction of traverse of the carriage.

Where the boom takes the form of a parallelogram linkage, the piston suitably acts on one of the linkage arms which is extended beyond the carriage pivot on the other side to the distributor.

Where two such booms are used for carrying distributors on opposite sides of the carriage, the extended arms of both linkages may be pivoted one to the other at a point where a single piston can act on both. In this way the two booms operate in unison.

In yet a further embodiment of the invention the distributor is retained in a rest position relative to the carriage by a ratchet attached to the carriage for engagement with a pawl located on the attachment device, a mechanism being provided to disengage the ratchet and pawl prior to deceleration of the carriage.

A parallelogram linkage as previously described could be used with such a ratchet device.

A limitation of the ratchet device, however, is that adjustment to the limits of free movement of the boom is stepwise rather than continuous and in addition it involves some dismantling to fit a different ratchet wheel.

It will be appreciated that the design of the apparatus may be modified and refinements added without detracting from the essence of the invention. Thus it is envisaged that the distributor might be located on the carriage by, for example, a slide attachment. However if the dispenser is to be operated in a situation where there is likely to be fouling of the machine parts by "overspray" of the reaction mixture, the simplicity of the pivoted boom is favoured because the pivot bearing can be easily protected.

While a slide attachment would permit the distributor to follow more precisely the transverse line of motion of the carriage, in practice this lack of precision with the pivoted boom has not been found to be a disadvantage.

Thus when used in conjunction with the dispenser described in Belgian Pat. No. 848619 the extent of free movement of the distributor from immediately prior to deceleration of the carriage to the point at which the carriage begins to accelerate in the reverse direction may be of the order of 20 cms, so that with a pivot/distributor radius of approximately 30 cms the deviation of the distributor from the transverse line of motion of the carriage is quite small.

When the distributor takes the form of a fan-spray nozzle, it is advantageous to angle the nozzle not only so that the plane of the fan-spray produced lies approximately in the direction of travel of the sheet or web material but also so that the plane is angled at approximately 15° to 20° from the perpendicular towards the side edge of the web or sheet material as this helps to offset "edge" distribution problems. If desired two or more nozzles which may be fed from the same mixing head can be carried on a single boom.

It is also envisaged that a vertically pivoted boom could be used or the distributor mounted in pendulum fashion about a horizontal axis on the carriage, but the horizontally oriented boom has the advantages that the distributor is maintained at a constant distance from and at a constant vertical angle to the conveyor, and that the extent of free movement is easily regulated by varying the position of the distributor on the boom without interfering with these other desirable features.

By way of example only a preferred embodiment of the invention will now be described with reference to the accompanying drawings in which.

Figure 1:
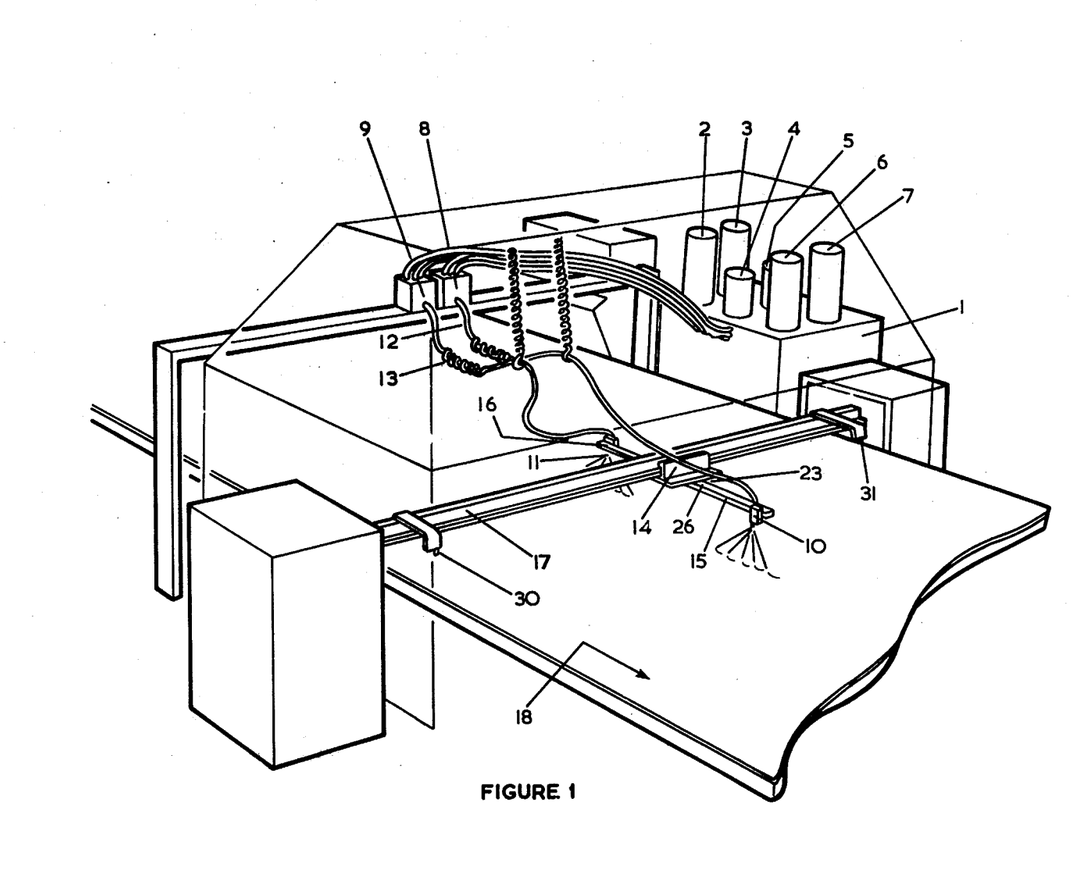
FIG. 1 is a perspective view of a carpet backing machine incorporating a dispenser according to the present invention.
Figure 2:
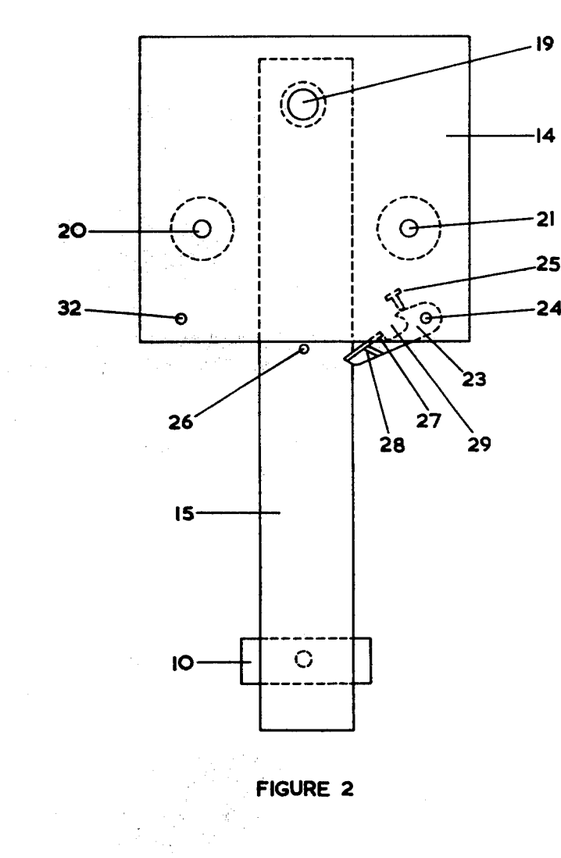
FIG. 2 is a plan view of a part of the dispenser of FIG. 1 detached from the carpet backing machine showing in broken line the underside of the part.

In FIG. 1, a metering unit 1 has two sets of feed vessels for different polyurethane foam-forming reaction mixtures which consist of polyol vessels 2 and 3, catalyst vessels 4 and 5 and isocyanate vessels 6 and 7. The two sets of vessels are feedably connected to separate stationary mixing heads 8 and 9 which in turn are feedably connected to separate distributors in the form of fan-spray nozzles 10 and 11 by flexible tubes 12 and 13. The spray nozzles 10 and 11 are attached to the carriage 14 by lightweight horizontal booms 15 and 16 which are pivoted at one end of the carriage 14 (the pivot 19 of one only of the booms is shown in FIG. 2) and towards their other end carry the distributors 10 and 11 respectively. The carriage 14 is constructed and arranged to be driven in a reciprocating motion along a rail 17 by a chain drive (not shown) housed on the underside of the rail which is reversed by an electromagnetic clutch. The rail is mounted transversely about a conveyor (not shown) for continuously advancing a semi-continuous, inverted web of carpet 18 in a horizontal plane.

Figure 3:
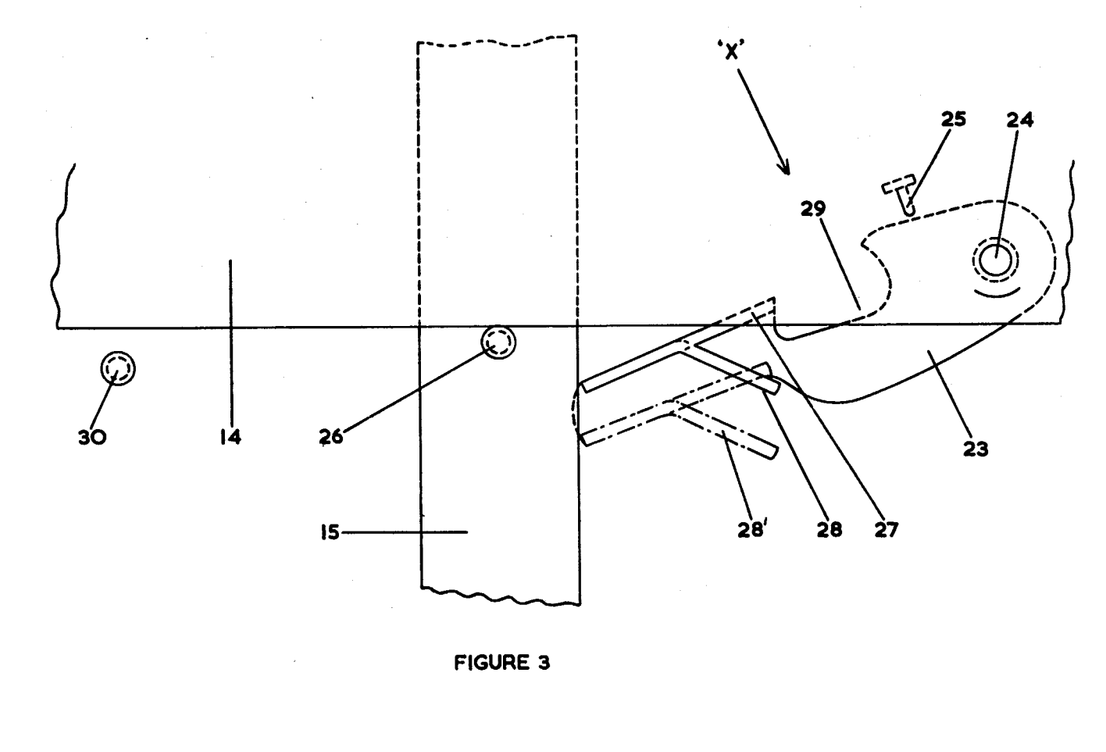
FIG. 3 is a detail from FIG. 2.
Figure 4:
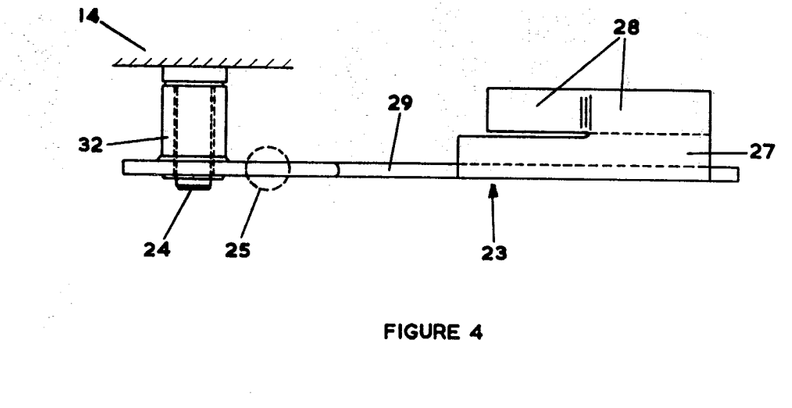
FIG. 4 is the same detail as FIG. 3 viewed in the direction of the arrow 'X'.

For simplicity and clarity, FIG. 2 shows only one boom 15, which is mounted at one end by an extended pivot 19 on the carriage 14. Towards the other end of the boom is carried the distributor 10 whose position is adjustable along the length of the boom. The boom pivots between limit stops or buffers 20 and 21 which are elastomeric washers. A detent 23 (shown more clearly in FIGS. 3 and 4) is also pivotally mounted on the carriage 14 by a pivot pin or journal 24 located in detent bearing housing 32. The boom pivot 19 is of such length that the boom can travel over the detent 23. A light pivot spring (not shown) biases the detent against an adjustable abutment 25 attached to the carriage 14 for regulating pivotal movement of the detent. A roller 26 rotatably mounted on the boom provides a catch member for retaining the boom 15, and hence distributor 10, in latched engagement with the detent when the boom pivots and strikes the buffer 21. In this event, with the detent 23 suitably disposed by adjustment of the abutment 25, the roller 26 impinges on a latching cam surface 27, formed by bending over the upper edge of the detent 23, and moves the detent against the spring bias (anticlockwise as viewed in FIGS. 2 and 3) until the roller latches in a recess 29 in the detent 23. Just before the roller 26 enters the recess 29, the boom 15 strikes the buffer 21. As will become evident later, the boom, during the operation of the apparatus, strikes the buffer 21 with sufficient force to compress it beyond the point at which the roller latches in the recess 29. In this latched position the buffer exerts a mild compressive force against the boom 15 to maintain the roller 26 and detent 23 in firm engagement. A release member 30 (vide FIGS. 1 and 3) also in the form of a rotatable roller is adjustably fixed to the rail 17 at a short distance from one edge of the conveyor. The release member 30 is arranged to co-operate with a release cam surface 28 on the detent 23 to displace the detent to a position of disengagement of the catch member as the carriage approaches the edge of the conveyor.

On the other side of the boom is a second detent (not shown) pivoted at a point 32 which is a mirror-image of the detent 23 except that the release cam surface $28^1$ (shown in broken line on detent 23 in FIG. 3) is formed by bending under the lower edge of the detent.

A co-operating release member 31 (vide FIG. 1) similar to release member 30 adjustably fixed to the rail 17 at a short distance from the other edge of the conveyor co-operates with cam surface $28^1$ to displace the second detent to a position of disengagement of the catch member 26. The different relative positions of the release cam surfaces 28 and $28^1$ avoid release members 30 and 31 inadvertently displacing the second and first detents respectively freeing the boom and distributor at the commencement instead of at the finish of a traverse movement across the conveyor.

The boom 16 and ancillary parts are arranged in similar fashion in an opposite position of the underside of the carriage 14.

In operation, the carriage 14 and distributors 10 and 11, depositing different foam-forming mixtures, are driven traversely across the conveyor in a reciprocating motion while the conveyor continuously advances the carpet 18 at uniform speed in the direction shown in FIG. 1. The foam-forming mixture delivered by distributor 10 is formulated to give the desired degree of penetration into the carpet backing while the foam-forming mixture delivered by distributor 11 is formulated to give a layer of foam having low density and low compression set; the layer of foam deposited by distributor 10 being oversprayed by the foam from the distributor 11 on a subsequent traverse.

The sequence of movements of the dispenser can be followed by considering the carriage 14 being driven at constant speed along the rail 17 from right to left in FIG. 1. For clarity the boom 15 is shown in an intermediate position on the carriage but normally at this stage of travel the distributor 10 will be retained in a first rest position with respect to the carriage 14 by detent 23 which is in latched engagement with catch member 26. As the carriage approaches the left-hand edge of the conveyor the release member 30 engages release cam surface 28 displacing the detent into a position for disengagement of the catch member. At this point the carriage has begun to decelerate prior to reversal of its direction of motion but the distributor, now released from its first rest position continues to traverse the conveyor at substantially constant speed, through pivotal movement of the boom, under its own momentum and having been given a slight impetus from the lightly compressed buffer 21. The carriage continues to decelerate, stops momentarily, and then as it begins to accelerate in the direction from left to right across the conveyor the distributor completes its free movement to the edge of the conveyor and takes up a second rest position as the catch member latches with the second detent. Thus once in this second rest position the direction of motion of the distributor is reversed by the carriage and in this same position the distributor is transported across the conveyor from left to right at constant speed. As the carriage approaches the right-hand edge of the conveyor the release member 31 engages release cam surface 28$^1$ on the second detent displacing the second detent into a position for disengagment of the catch member. Thereaffter a similar sequence of movements follows on the right-hand side of the conveyor until the carriage arrives back to its original position moving from right to left across the conveyor having completed one cycle.

The sequence of movements of the distributor 16 follows the same pattern.

Figure 5:
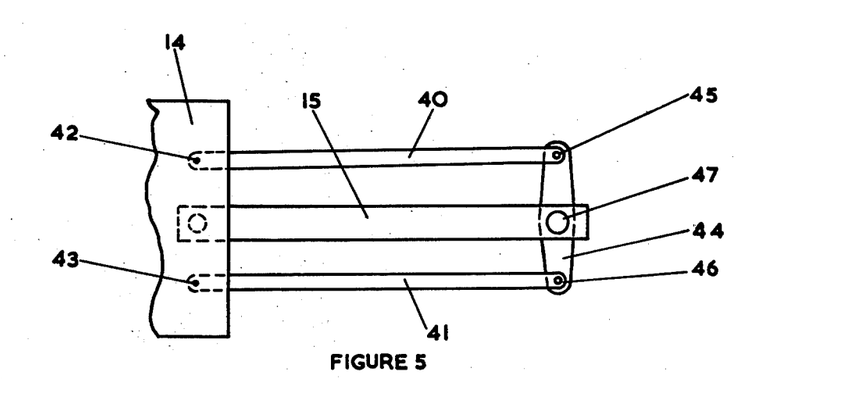
FIGS. 5, 6 and 7 are plan views of parts of alternative dispensers to that shown in FIG. 2.

In FIG. 5, two arms 40 and 41, either side of boom 15, are each attached at one end to the carriage 14 by pivots 42 and 43 and at the other end to a plate 44 by pivots 45 and 46. The arms thus form a parallelogram linkage with the carriage and plate. The boom 15 is attached to the plate 44 by a pivot 47. The plate carries a spray nozzle (not shown).

This alternative dispenser, of which FIG. 5 shows a part, is in all other respects similar in construction and operation to that shown in FIGS. 1 to 4. The parallelogram linkage serves to maintain the angle of the spray nozzle carried on plate 44 constant to the direction of advancement of the carpet throughout the transversing movement of the dispenser.

Figure 6:
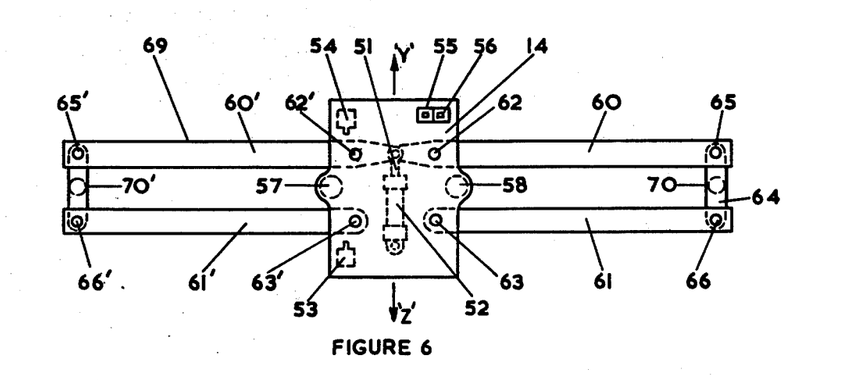

In FIG. 6, a parallelogram linkage similar to that shown in FIG. 5 is formed from lightweight swinging arms 60 and 61 attached to plate 64 by pivots 65 and 66 respectively and to carriage 14 by pivots 62 and 63 respectively. Plate 64 carries a spray nozzle 70. A second parallelogram linkage 69 attached to the opposite side of the carriage is formed from similar parts identified by the same numbers with superscripts. Elastomeric buffers 57 and 58 are located between opposite facing arms.

Extensions of the arms 60 and 60$^1$ are pivotally attached to the piston 51 of a double-acting air cylinder 52 mounted on the underside of the carriage and shown in broken line. Triggers 53 and 54, also on the underside of the carriage and responsive to pressure exerted by pivoting arms 41$^1$ and 40$^1$ respectively, actuate a supply of air, each to opposite sides of the cylinder 52. Cams 55 and 56 co-operate with strikers, fixedly located near each end of the carriage rail (not shown), each to exhaust opposite sides of the cylinder 52.

In this alternative dispenser, a penumatic latching device replaces the mechanical latching device of the dispenser shown in FIGS. 1 to 4. The boom of the latter dispenser is also replaced by the swinging arms 60 and 61 which together form an attachment device for carrying the distributor on the carriage. These swinging arms form part of a parallelogram linkage which, like the linkage shown in FIG. 5, maintains the spray nozzle 70 at a constant angle to the direction of advancement of the carpet throughout the transversing movement of the dispenser.

For clarity, the arms 60 and 61 are shown in an intermediate position on the carriage. In normal operation, however, they will be at either of two extreme positions determined by the buffers 57 and 58.

Thus when the carriage is traversing the central portion of the carpet and moving in the direction 'Y', the arms 60$^1$ and 60 will be held against buffers 57 and 58 respectively by the action of the piston 51 which is kept in an outward position by air pressure on one side of the cylinder. Before the carriage decelerates, the air pressure in that side of the cylinder is released by the action of cam 55 and its striker so that the arms 60, 60$^1$ and 61, 61$^1$ can move at constant speed under their own momentum when the carriage slows down to reverse direction. As the arms swing in direction 'Y', arm 60$^1$ strikes trigger 54 which actuates a supply of air to the other side of the cylinder 52. When the carriage has picked up speed in direction 'Z', piston 51 is kept in an inward position and in turn holds arms 61$^1$ and 61 against buffers 57 and 58 respectively.

The rates of pressure decay and pressure rise in opposite sides of the cylinder can be adjusted to control the swing of the arms as desired.

As the carriage approaches the end of its traverse in direction 'Z', cam 56 and its striker cause pressure to be released from the appropriate side of the cylinder allowing free movement of the arms while the carriage decelerates. When the arm 61$^1$ strikes trigger 53, air is supplied to the other side of the cylinder so that the piston is once again kept in an outward position as the carriage picks up speed in direction 'Y'.

Figure 7:
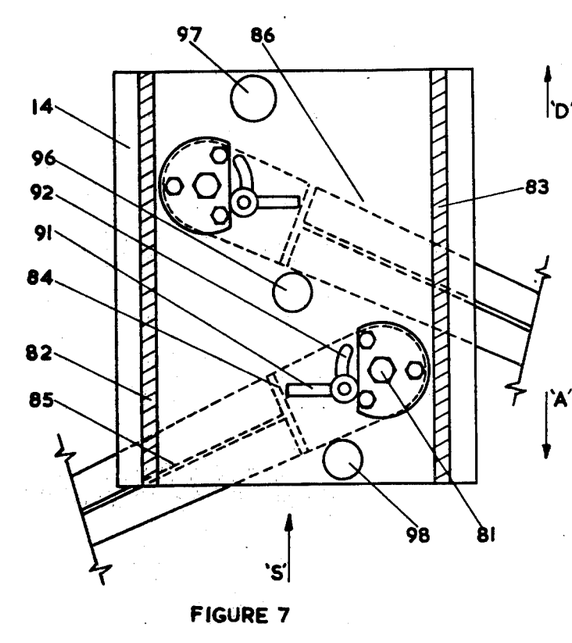
Figure 8:
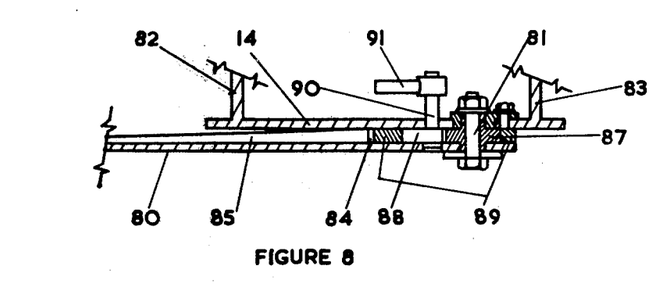
FIG. 8 is a side elevation of the dispenser shown in FIG. 7 viewed in the direction of the arrow 'S'.

In FIGS. 7 and 8, a boom 80 (shown in part) is pivotally attached to carriage 14 by bolt 81. The carriage 14 is suspended from a rail (not shown but similar to the rail 17 of FIG. 1) by runners 82 and 83 (shown in part). The boom 80 is strengthened by ribs 84 and 85 and carries a spray nozzle (not shown) at the end distant from the carriage. A similar boom 86 carries a second spray nozzle (not shown) and its construction and operation will be readily understood from the description of boom 80. Elastomeric buffers 96, 97 and 98 are located on the carriage 14.

A ratchet 87 and pawl 88 are located in a housing 89 on the boom 80. Bolt 81 passes through the ratchet 87 which is fixedly attached to the carriage 14. The pawl 88 is carried on a spindle 90 which passes through a slot 92 in the carriage 14 and which is pivotally mounted on the boom 80. An arm 91 enables the spindle 90, and hence the pawl 88, to be rotated.

The ratchet 87 and pawl 88 are shown in detail in their housing 89 in FIGS. 9-12. For clarity other components have been omitted from these figures.

A spring loaded ball 93 is biased against the pawl 88 in an undulating recess 94. The ball and recess co-operate to provide means for weakly maintaining the pawl in either of two positions. A peg 95 located on the carriage rail at a mid position registers with the arm 91 to change the position of the pawl during the traverse of the carriage.

Figure 9:
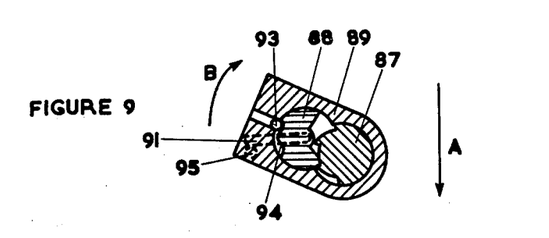
FIGS. 9 to 12 are details of a ratchet mechanism used in the dispenser shown in FIG. 7 at different stages during the operation of the dispenser.
Figure 10:
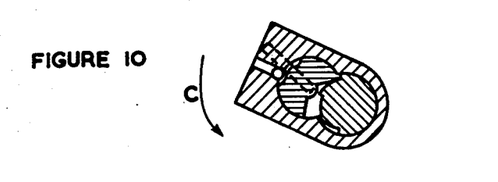
Figure 11:
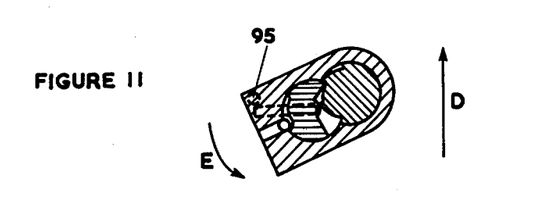
Figure 12:
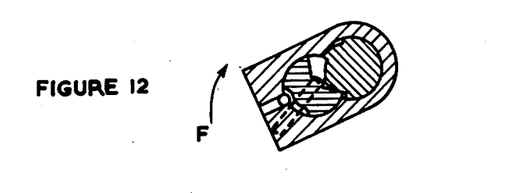

In operation, when the carriage 14 is moving in direction 'A' and before it reaches the mid traverse position, the arrangement of the ratchet and pawl is as shown in FIG. 9. As the carriage passes peg 95, the arm 91, and hence pawl 88, is moved relative to the housing 89 and boom 80 in the direction 'B' as shown in FIG. 9 until it takes up the position shown in FIG. 10.

As the carriage decelerates towards the end of the traverse, the boom swings freely on the carriage in direction 'C' under its own momentum until it is stopped by buffer 98. The ratchet and pawl have now assumed the positions shown in FIG. 11 so that the boom 80 is prevented from bouncing off the buffer. It is held in this way until the direction of action of the pawl and ratchet is reversed at the mid traverse position as the carriage travels in direction 'D'. At this point the peg 95 causes the arm 91, and hence the pawl 88, to move relatively to the boom 80 in direction E. As the carriage decelerates towards the end of its traverse in direction 'D' the boom is free to swing under its own momentum in direction 'F' (see FIG. 12) until it is stopped by the buffer 96. It is prevented from bouncing off the buffer by the ratchet and pawl which are once again in the position shown in FIG. 9.

The foam backing produced on the apparatus of the invention shows significantly less "edge build-up" than the foam backing produced on the same apparatus in which the distributors 10 and 11 are held fixed relative to the carriage.

We claim:

1. Apparatus for dispensing a liquid reaction mixture onto web or sheet material which comprises a frame constructed to be mounted above advancing web or sheet material, said frame having guide means supporting a carriage which is arranged to be driven in a reciprocating fashion in a line of motion transverse to the direction of advancement of said web or sheet material, and a distributor connectable to a supply of liquid reaction mixture for depositing said mixture onto said web or sheet material, said distributor being attached to said carriage by an attachment device which permits limited free movement of said distributor relative to said carriage and transversely to the direction of advancement of said web or sheet material when the carriage is decelerated prior to reversal of its direction of motion.

2. Apparatus as claimed in claim 1 for applying a flexible polyurethane foam backing to a length of carpet which comprises
   (a) carpet-advancing means for continuously advancing a length of carpet in a first line of motion, said carriage being supported by said guide means in a position above said carpet-advancing means;
   (b) a lightweight boom freely pivoted at one end to said carriage and carrying at the other end said distributor for depositing a flexible polyurethane foam-forming mixture onto the non-decorative side of said carpet;
   (c) a mixing head connectable to supplies of flexible polyurethane foam-forming ingredients which is of a type designed to mix said ingredients to form a foam-forming mixture, said mixing head being feedably connected to said distributor for supplying to said distributor a flexible polyurethane foam forming mixture;
   (d) a detent attached to said carriage and biased towards a position for engagement with a catch member attached to said boom; and
   (e) a release member located at a fixed position above the line of motion of said carriage to displace said detent to a position for disengagement of the catch member prior to deceleration of said carriage, said distributor being permitted thereby limited free movement relative to said carriage and transversely to the line of motion of said carpet when the carriage is decelerated prior to reversal of its direction of motion.

3. Apparatus as claimed in claim 1 in which limit stops prevent continued free movement of said distributor when said carriage begins to accelerate in a reverse direction.

4. Apparatus as claimed in claim 1 in which limit stops provide two rest positions for said distributor relative to said carriage and between which rest positions said distributor is permitted free movement, said distributor occupying said rest positions alternately as said carriage reciprocates and moving from one rest position to the other each time said carriage decelerates prior to reversal of its direction of motion.

5. Apparatus as claimed in claim 1 in which said attachment device is a lightweight horizontal boom which is pivoted at one end to said carriage and at the other end carries said distributor, free movement of said distributor being accomplished through pivotal movement of said boom.

6. Apparatus as claimed in claim 5 in which said boom pivots between limit stops and the position of said distributor on said boom is adjustable along the length of said boom.

7. Apparatus as claimed in claim 5 in which said distributor is retained in a rest position on said carriage by a detent attached to said carriage and biased towards a position for engagement with a catch member attached to said boom, a release member being located at a fixed point above the line of motion of said carriage to displace the detent to a position for disengagement of the catch member prior to deceleration of said carriage.

8. Apparatus as claimed in claim 7 in which a resilient buffer is mounted on said carriage in a position such that said boom strikes said buffer as said catch member engages said detent, said buffer continuing to exert a mild compressive force against said boom to maintain catch and detent in firm engagement.

9. Apparatus as claimed in claim 1 in which said distributor is retained in a rest position on said carriage by a detent attached to said carriage and biased towards a position for engagement with a catch member in fixed relationship to said distributor, a release member being arranged to displace said detent to a position for disengagement of said catch member prior to deceleration of said carriage.

10. Apparatus as claimed in claim 1 in which said distributor is a fan-spray nozzle, said nozzle being positioned so that the plane of the fan-spray produced lies in the direction of motion of said sheet or web material and is angled at approximately 15° to 20° from the perpendicular towards the side edge of said web or sheet material.

* * * * *